United States Patent [19]

Holzhausen

[11] Patent Number: 5,482,330
[45] Date of Patent: Jan. 9, 1996

[54] APPARATUS FOR THE FLEXIBLE CONNECTION OF PIPES IN EXHAUST LINES OF MOTOR VEHICLES

[75] Inventor: Wieland Holzhausen, Auerbach, Germany

[73] Assignee: IWK Regler Und Kompensatoren GmbH, Stutensee, Germany

[21] Appl. No.: 241,699

[22] Filed: May 12, 1994

[30] Foreign Application Priority Data

May 25, 1993 [DE] Germany ............... 43 17 334.9

[51] Int. Cl.⁶ ............................................. F16L 21/00
[52] U.S. Cl. ................................... 285/226; 285/299
[58] Field of Search .......................... 285/49, 229, 300, 285/226, 299

[56] References Cited

U.S. PATENT DOCUMENTS

| | | | |
|---|---|---|---|
| 1,968,715 | 7/1934 | Slade | 285/300 |
| 2,427,456 | 9/1947 | Hoy | 285/299 X |
| 2,771,311 | 11/1956 | Hottenroth, Jr. | 285/299 |
| 3,688,802 | 9/1972 | Bauman et al. | 285/229 X |
| 4,659,117 | 4/1987 | Holzhausen et al. | 285/299 X |
| 4,762,330 | 9/1988 | Lönne et al. | 285/332.1 X |
| 4,893,847 | 1/1990 | Hess | 285/226 |
| 5,090,746 | 2/1992 | Holzhausen | 285/226 |

FOREIGN PATENT DOCUMENTS

| | | |
|---|---|---|
| 9209484 | 6/1992 | Germany . |
| 9301772 | 2/1993 | Germany . |
| 5-10120 | 1/1993 | Japan . |
| 62996 | 5/1927 | Sweden ............... 285/300 |

Primary Examiner—Terry Lee Melius
Assistant Examiner—Heather Chun Shackelford
Attorney, Agent, or Firm—Antonelli, Terry, Stout & Kraus

[57] ABSTRACT

An apparatus for an elastic connection of pipe, particularly in exhaust lines of motor vehicles. A first pipe end and a second pipe end are connected by a flexible line elements such as a metal bellows. A casing accommodates at least one damping cushion and first and second abutment are respectively connected with the first and second pipe ends. The casing includes circumferentially juxtaposed wall portions forming the first and second abutment with the wall portions being movable relative to one another so as to be brought into abutment with the at least one damping cushion.

20 Claims, 9 Drawing Sheets

5,482,330

APPARATUS FOR THE FLEXIBLE CONNECTION OF PIPES IN EXHAUST LINES OF MOTOR VEHICLES

FIELD OF THE INVENTION

The invention relates to an apparatus for the flexible connection of pipes, particularly in exhaust lines of motor vehicles, with pipe ends connected by a flexible line element, such as a metal bellows, with the pipe ends being connected with different abutments of pressed metal wire damping cushions located in at least one casing.

BACKGROUND OF THE INVENTION

Apparatuses of this type for the connection of pipes, particularly in exhaust lines of motor vehicles with pressed metal wire damping or absorbing cushions located in casings are known from EP-A-208 128 or U.S. Pat. No. 4,657,117.

Abutments provided on both end faces of the casing receiving the damping or absorbing cushion or pad are connected to the same connection end of the apparatus for the flexible connection of pipes, in short a decoupling element, while an abutment is connected to the other end with the abutment engaging, which engages approximately centrally between two cushions arranged in axially succeeding manner or in a radial recess of a single cushion.

It has been shown that in the known apparatuses and decoupling elements the damping cushions only function with a very small part of their volume, namely where the forces are directly introduced, whereas most of the volume remains undisturbed. Thus, the cushions are overdimensioned, this in particular being necessary due to the central engagement of the abutment connected to one connecting end. The cushions are also exposed to corrosive influences, because the casing cannot be completely closed, namely either within the flow path to the hot exhaust gases, or outside said flow path to dirt, wet and salt. It has also been found that in particular that part of the cushions which does not or only slightly functions during normal operating conditions hardens or becomes encrusted, so that the dynamic characteristics present in the new state are subject to disadvantageous changes.

As a result of the indicated overdimensioning the known damping or absorbing apparatuses and decoupling elements took up a large amount of space, either in the radial, or in the axial direction.

SUMMARY OF THE INVENTION

The aim of the invention is therefore to avoid the aforementioned disadvantages.

In the case of an apparatus of the aforementioned type, this problem is solved by the invention in that juxtaposed, outer, frontal casing wall portions are movable relative to one another as abutments for the damping cushions.

Therefore the casing halves, and in particular, the casing wall portions are not directly in contact. Instead between the casing halves and wall portions there are gaps and spaces. Juxtaposed, outer, frontal casing wall portions located on one side of the damping cushion are consequently movable relative to one another and, in particular, in the direction of the perpendicular thereof.

Both axial abutments for the damping cushions can be displaced towards the outside, i.e. into the casing walls for the cushions. Abutments acting against one another are able to absorb both pulling movements on the two connection ends of the decoupling element and also pressing movements against one another. In each end face of the cushion, circumferentially juxtaposed wall portions are alternately connected to one connection end or other connection end of the decoupling element and therefore are axially movable relative to one another. Due to these features the centrally positioned abutments according to the prior art are avoided. This has made it possible to reduce the cushion volume and substantially by that part which has previously been inactive. For example, compared with designs having two cushions located on either side of the central abutment, one of these has been eliminated. In addition, the apparatus according to the invention forms a dynamically more active component. Apart from material savings with respect to the relatively expensive cushion material, the construction according to the invention has the advantage of being very compact, particularly with respect to the overall length of the decoupling elements as well, into which the apparatus according to the invention is inserted. This is important, because not very much space is available at the particularly effective installation points for decoupling elements. The degree of utilization of the apparatus according to the invention is greater than in the prior art, while the constructional effort and expenditure are less. As the damping cushions can become entangled and therefore cannot be separated, e.g. by a vibrating conveyor, limits are placed on the automatic manufacture of the decoupling elements and the prior art. However, the apparatuses according to the invention can be prefabricated as single, uncomplicated units (cassettes) and, as such, can be automatically conveyed on and processed. The cushions can be supplied in per se known manner in strand form and for use in the casing halves can be cut to length at the latter and the cut-to-length portions can be automatically used, so that the problem of individualizing or separating cushions does not occur.

While it is fundamentally possible to provide rigidly interconnected wall portions on both end faces of the casing so as to face one another, although this leads to gravitational forces and the movement is absorbed by shearing actions of the cushion material, according to preferred developments one wall portion is faced by another wall portion movable relative thereto on the other end face of the casing, and in particular, the rigidly interconnected wall portions located on both end faces of the casing overlap one another.

Fundamentally there is only one axially directed cushion layer.

However, in special constructions there can be several cushion layers in the axial direction without having abutments between them. The apparatus according to the invention can be constructed as an individual casing to be arranged on the circumference of the decoupling element, but can also have a circular construction. In the latter case the damping cushions can also be circular or part-circular, either their radial end faces engage on one another or engage on specifically provided abutments. In the latter case and in the case of a separate casing with damping cushions provided around the circumference of the exhaust lines, the damping cushions are arranged in radial planes, in which there are preferred angular movements between the pipe ends.

Whereas fundamentally the wall portions movable relative to one another have the same size, according to a preferred development the frontal wall portions movable relative to one another can be given a different size and, in particular, the total surface of a first group of wall portions to be interconnected can differ from the total surface of the group of the wall portions movable relative thereto, but also rigidly interconnected. The group of the wall portions with the larger total surface is that which may have to absorb static initial loads, such as the weight of the exhaust system.

With respect to the angular movements of the pipe ends of the decoupling elements, which are provided with the damping apparatuses according to the invention and therefore having a good angular articulated nature, according to a preferred development the wall portions are curved and, in particular, convex with respect to the damping cushion or cushions.

Fundamentally the cushions can be inserted in tensionless manner in the casing of the apparatus according to the invention. However, according to a preferred development, the damping cushions are pretensioned in the casings, so that even with end wall areas moving apart under certain movements there is only a small gap between them and adjacent cushion outsides and instead the cushions follow the movement of the wall portions.

According to further developments of the invention the damping or absorbing cushions or pads are covered by facing full wall surfaces, whereof frontal wall portions extend angularly with a relative circumferential spacing, engage in one another and in angular manner to the frontal wall portions extend extensions and in particular the wall parts of the casing have reinforcing seams or fins.

BRIEF DESCRIPTION OF THE DRAWINGS

Further advantages and features of the invention can be gathered from the claims and the following description of preferred, non-limitative embodiments and the attached drawings, wherein:

FIG. 9b is a cross-sectional view taken along the line 9b—9b in FIG. 9a;

FIG. 10b is a cross-sectional view taken along the line 10b—10b in FIG. 10a.

DETAILED DESCRIPTION

Figure 1:
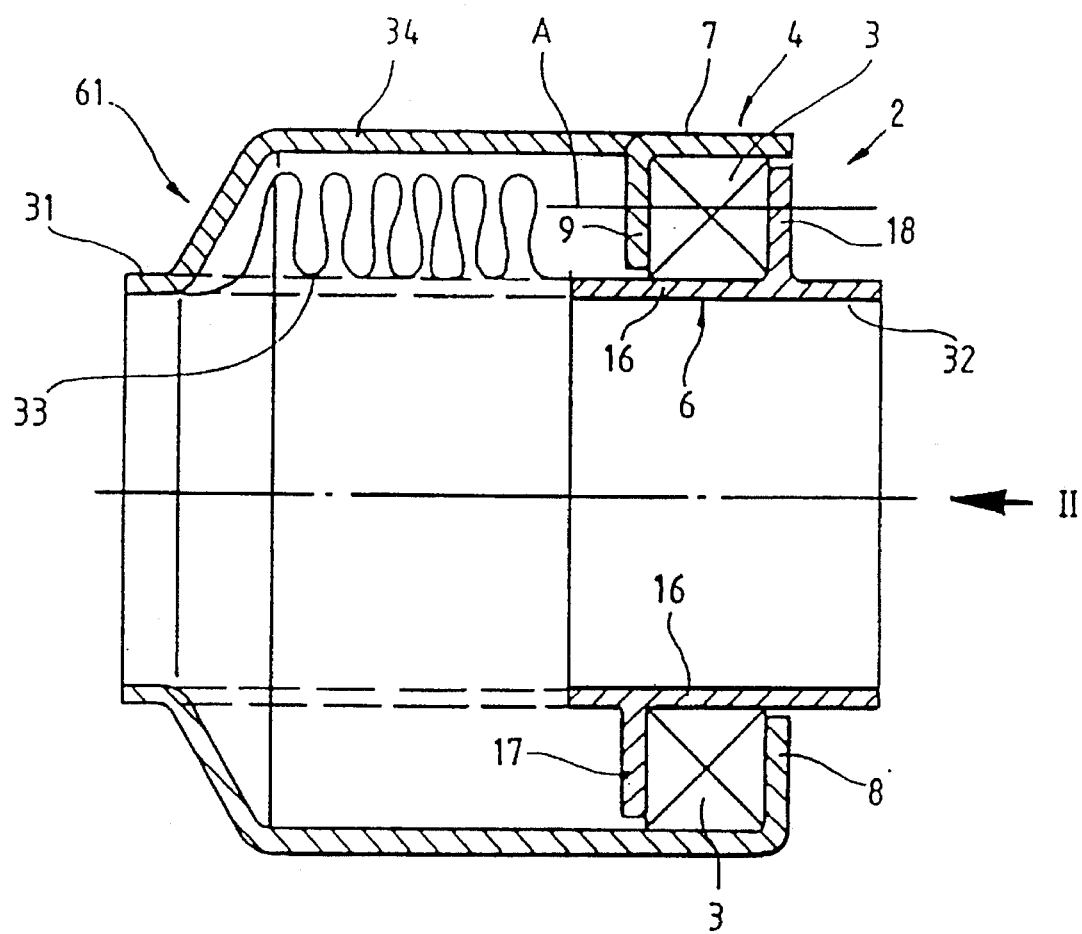
FIG. 1 is a longitudinal cross-sectional view of a first embodiment of an apparatus for flexible connection of pipe constructed in accordance with the present invention with an integrated damping means taken along the lines I—I in FIG. 2.

An apparatus 61 according to the invention for the flexible connection of pipes, particularly in exhaust lines of motor vehicles, with an integrated movement damping or absorbing device has, in a conventional manner, a connection end 31, a flexible line element or bellows 33, a bellows casing 34 engaging over the bellows 33, and a connection end 32, with the bellows 33 being positioned between the two connection ends 31, 32. On the cylindrical bellows casing 34 is formed a casing part or half 4 and, on the connection end 32, the casing part or half 6 of the cassette casing.

Figure 8:
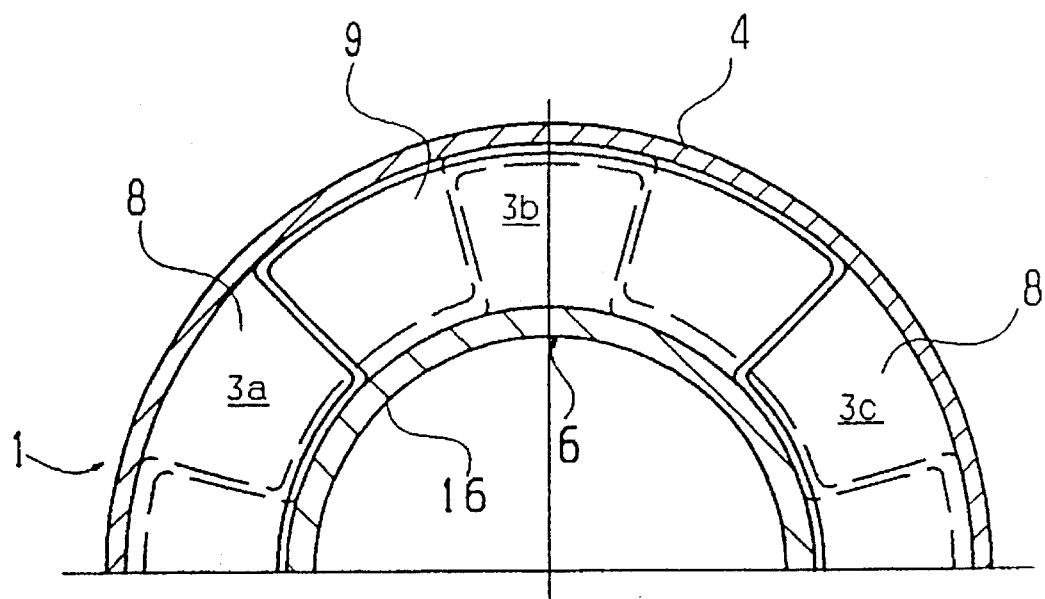
FIG. 8 is a cross-sectional view of a portion of a still further embodiment of a damping means for an apparatus constructed in accordance with the present inventions.

The damping device 1 of the apparatus has a casing 2 (FIG. 1), which is preferably circular, with the casing 2 containing pressed metal wire damping or absorbing cushions or pads 3 and, namely, in the case of a circular shape, either a circular cushion or several sector-shaped cushions, with their radially directed ends either connected to one another or engagable on abutments connected to the casing 2. In the axial direction several damping cushions 3a, 3b, 3c can be juxtaposed, with no rigid abutments connected to the casing to be provided between the damping cushions 3a, 3b, 3c as shown most clearly in FIG. 8.

Figure 2:
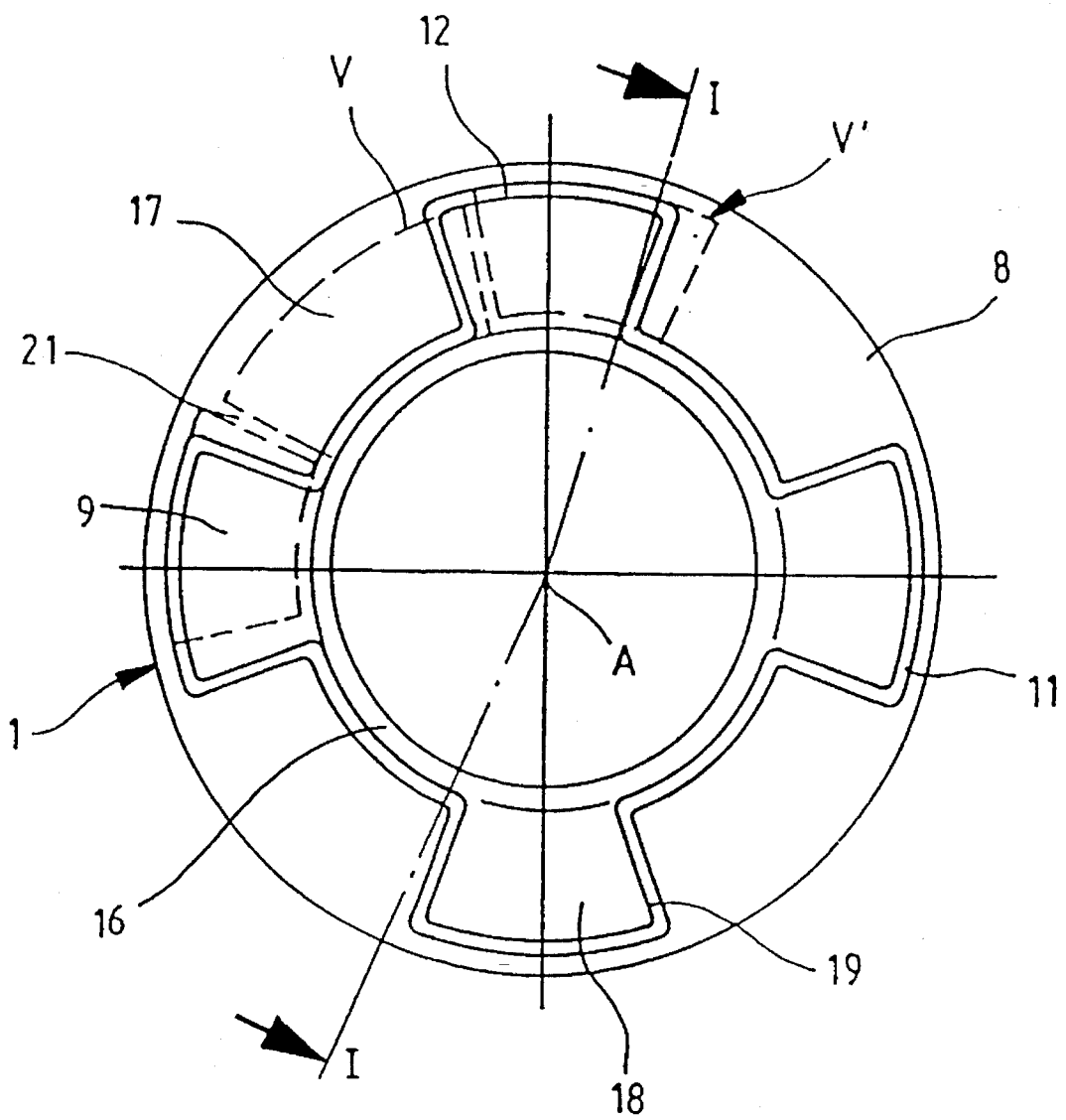
FIG. 2 is a sectional view taken in the direction of the arrow II in FIG. 1.
Figure 3:
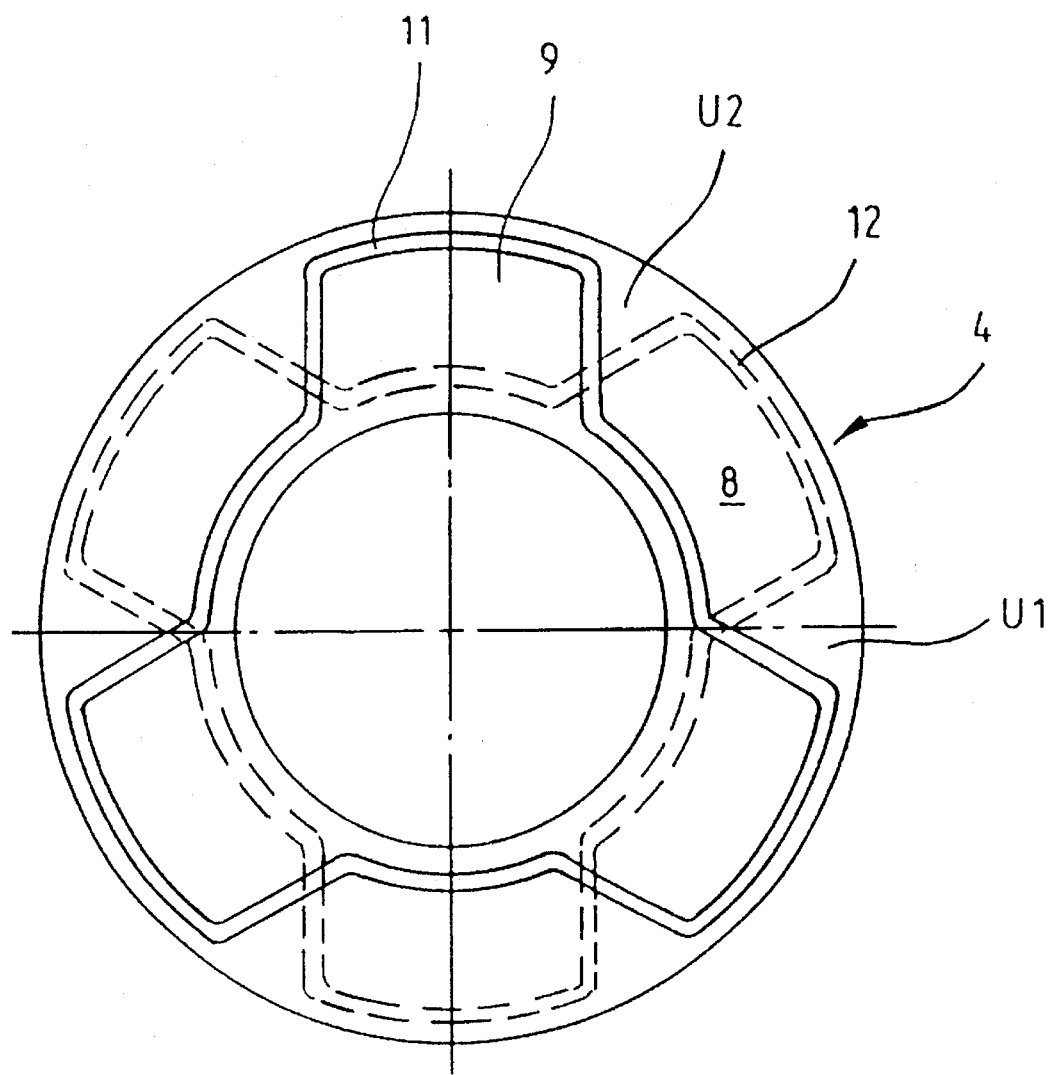
FIG. 3 is a schematic view corresponding to FIG. 2 of a further embodiment of an apparatus according to the present invention.

The casing 2 comprises 2 casing parts or halves 4, 6. One of the casing halves 4 has an outer circumferential wall 7 from which extends inwardly front wall portions 8, 9, between which are, in each case, formed recesses 11, 12 (FIG. 2). The front wall portions 9, 8 which enclose between them the damping cushion or cushions 3 are preferably circumferentially displaced with respect to each other in that either a recess 12 precisely symmetrically faces the wall portion 8 (FIG. 4) or has a slight angular displacement V (FIG. 2). As a result of the angular displacement V, which corresponds to a displacement V' (FIG. 2) of the wall 9 adjacent to the recess 12, there is a partial covering (corresponding to V') of the wall portions 8, 9 formed on facing end faces of the wall portions 8, 9. Between the edges of the casing parts or halves 4, 6, in the unloaded state, there are finite spacings and gaps which permit relative mobility.

Figure 4:
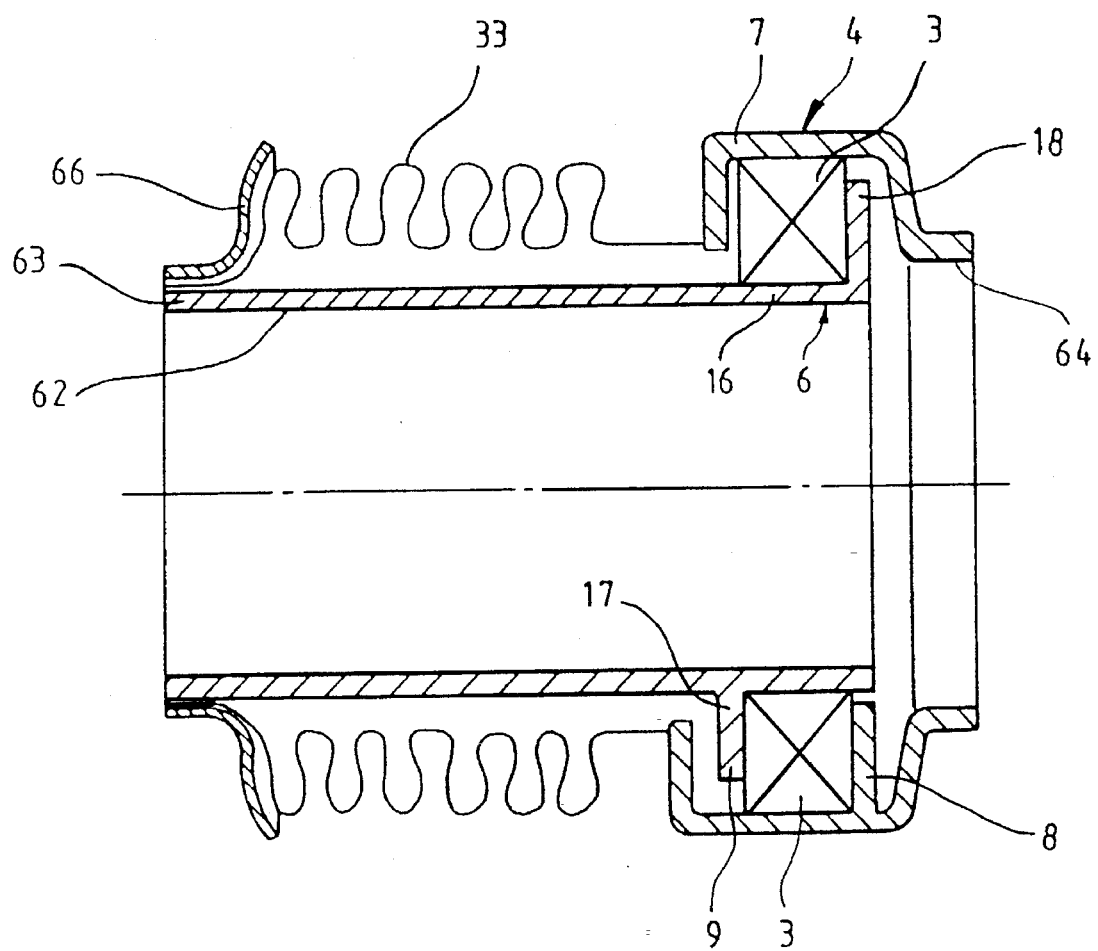
FIG. 4, is a longitudinal sectional view of another embodiment of the apparatus according to the present invention.

Covering areas U1, U2 are achieved in the case of a symmetrical construction of FIG. 4 at the outer casing part 4 in that the wall parts 8, 9 of casing part 4 are larger than the wall parts of the inner casing part 6. The inner casing part 6 has an inner circumferential wall 16 from which extends outwards wall portions 17, 18 into the recesses 11, 12 between the wall portions 8, 9 of the outer casing part 6 and form between them corresponding recesses 19, 21.

Therefore the damping cushion or cushions 3 are located on their end faces, considered circumferentially, alternately on wall portions 8, 17 of the casing parts 4, 6 and on the other circumferential side, once again considered circumferentially, alternately on wall portions 9, 18 of the casing parts 4, 6.

The damping cushions 3 are inserted with a pretension in the casing 2, by being inserted in the casing parts 4, 6 accompanied by compression.

The casing parts 4, 6 are connected to different pipe ends linked by a gas-tight, flexible pipe part, such as a bellows, or are constructed thereon.

If the pipe or connection ends move relative to one another, then this movement is transferred to the two casing parts 4, 6. In the case of an axial movement, the two wall areas 8, 17 are moved against one another,(whereas the wall areas 9, 18 move apart) and tend to further compress the damping cushion 3, which as a result of its damping characteristics exerts a vibration-damping limitation on the movement of the wall portions 8, 9 and therefore the pipe ends.

In the construction of FIG. 4 there is no cylinder jacket-like bellows casing 34 engaging over the bellows 33, as in the case of FIG. 1. Instead of this a supporting tube 62 is guided within and by the bellows 33 and on it is constructed a connection end 63. Radially within the damping cushion 3 the supporting tube 62 forms the inner circumferential wall surface 16 of the inner casing part 6. Once again there are the two rigid, front wall portions 17, 18. The other pipe end 64 is constructed as the casing part 4 with the circular circumferential wall 7 and the front wall portions 9, 8. In the vicinity of the connection end 63, there is a protection ring 66 for protecting the bellows 33.

Figure 5:
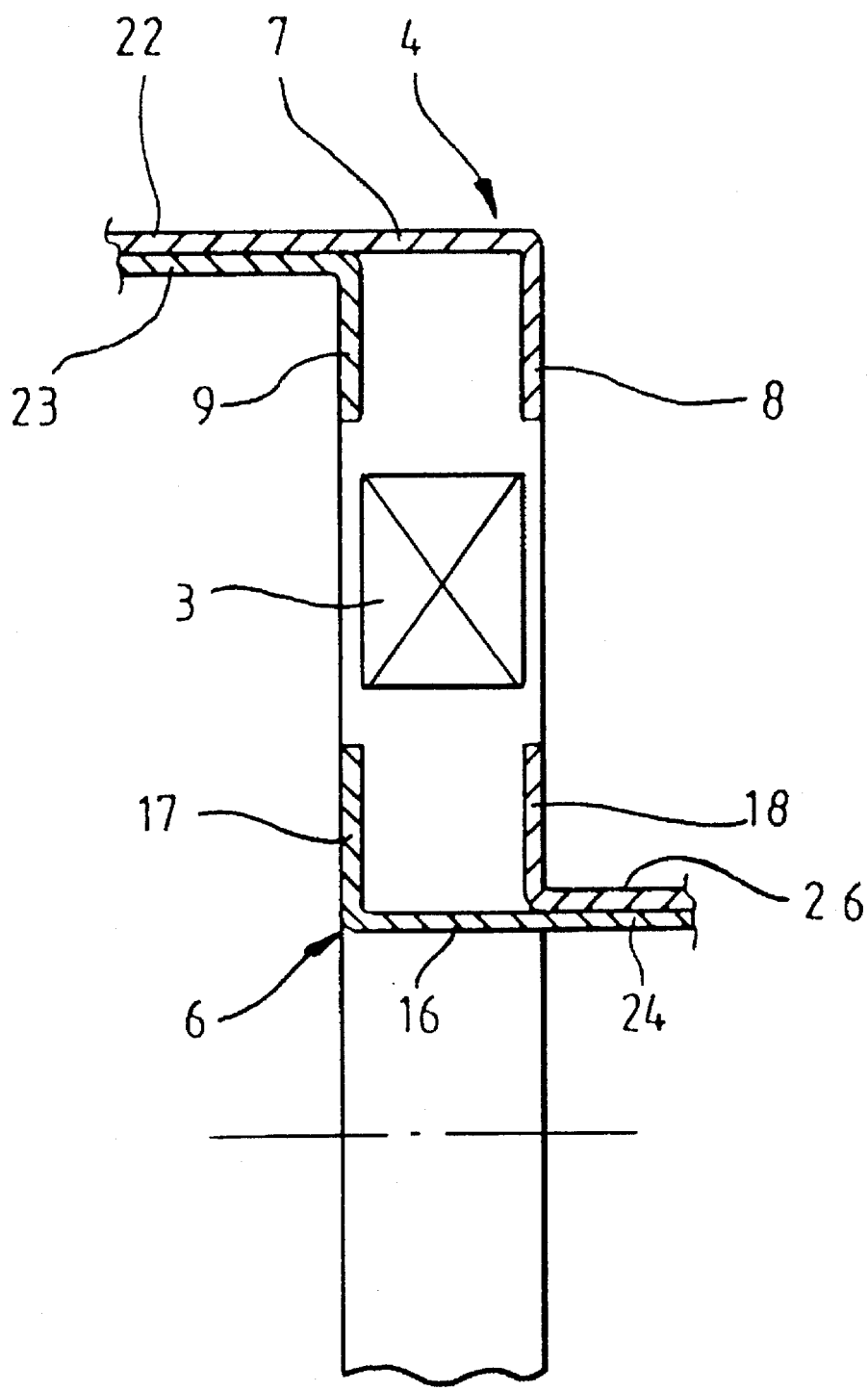
FIG. 5 is a cross-sectional view of a portion of first embodiment of a damping means for an apparatus according to the invention.

In the construction of FIG. 5 the casing parts 4, 6 are in each case in two-part form with the wall portions 8 being constructed in one piece with the circumferential wall 7 and the circumferential wall 7 has an attachment 22. The wall portions 9 are constructed on an angular attachment 23, which is connectable, such as by welding, to the attachment 22 and it is possible to use all welding types, such as fusion, resistance or laser welding. However, it is also possible to use mechanical joining, such as pressing, beading, pressure joining, etc.

For assembly purposes, e.g. initially the parts 7, 8, 22 and 18 are so telescoped with the attachment 26 that the wall portions 18 engage between the wall portions 8. Then, from the left, the damping cushion 3 is moved up to the wall portions 8, 18. Then, once again in the axial direction, either simultaneously or successively, the parts 9, 23 and 16, 17 with the attachment 24 are moved against the left-hand face of the damping cushion 3, the wall portions 17 engaging in the gaps between the wall portions 9 and vice versa. The desired pressure is exerted and subsequently parts 22 and 23 and 24 and 26 are joined in the described manner by welding or one of the other methods indicated.

The parts 22 to 26 are initially used for fixing the part 7, 8, 22 to the part 9, 23 or the part 16, 17, 24 to the part 18, 26 with the damping cushion 3 pretensioned. However, it also serves to fix the resulting apparatus according to the invention to the connection piece of the corresponding decoupling element.

Figure 6:
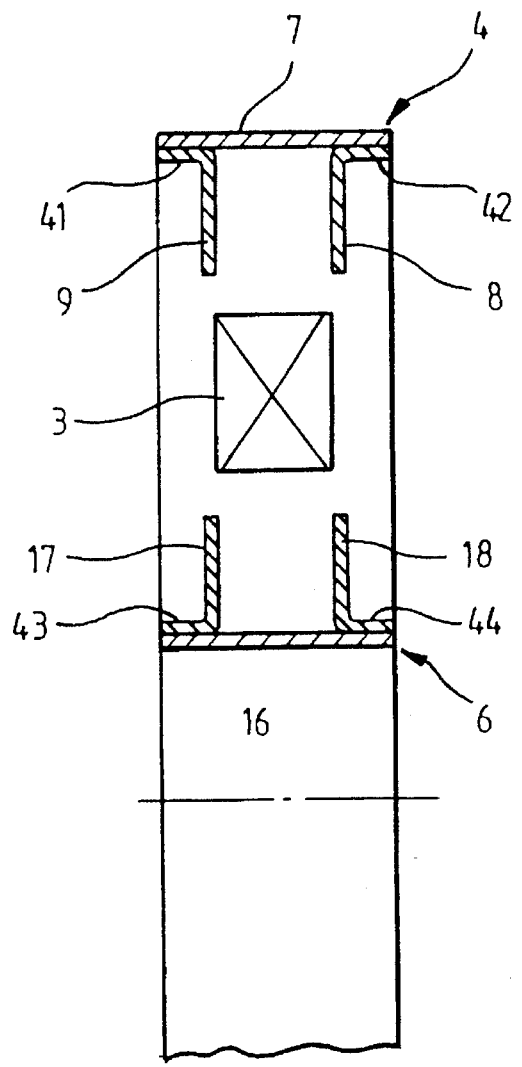
FIG. 6 is a cross-sectional view of a portion of yet another embodiment of a damping means for an apparatus according to the present invention.

FIG. 6 shows a similar construction to that of FIG. 5. However, here there are no radial end wall parts 8, 9, 17, 18 connected in one piece to the circumferential walls 7, 16 of the casing parts 4, 6 and are instead constructed as separate parts with angular attachments 41, 42, 43, 44, by which the end wall portions 8, 9, 17, 18 are connected to the circular or cylinder jacket-shaped circumferential wall part 7, 16.

Figure 7A:
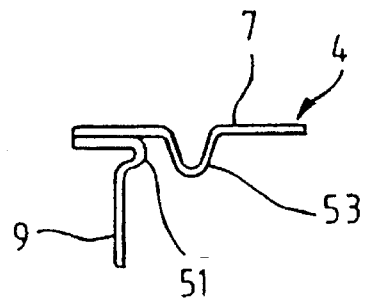
FIGS. 7a and 7b are schematic views of constructions of casing parts of a casing for the damping means constructed in accordance with the present invention.
Figure 7B:
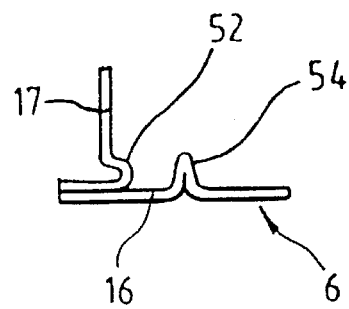

FIG. 7 shows fins 51, 52, 53, 54 on the casing parts 4, 6. If necessary, following the assembly of the cassette-like casing, subsequently the pretension can be matched in desired manner by the said fins 51 to 54, e.g. adapted to different uses of the prefabricated apparatuses according to the invention.

Figure 9A:
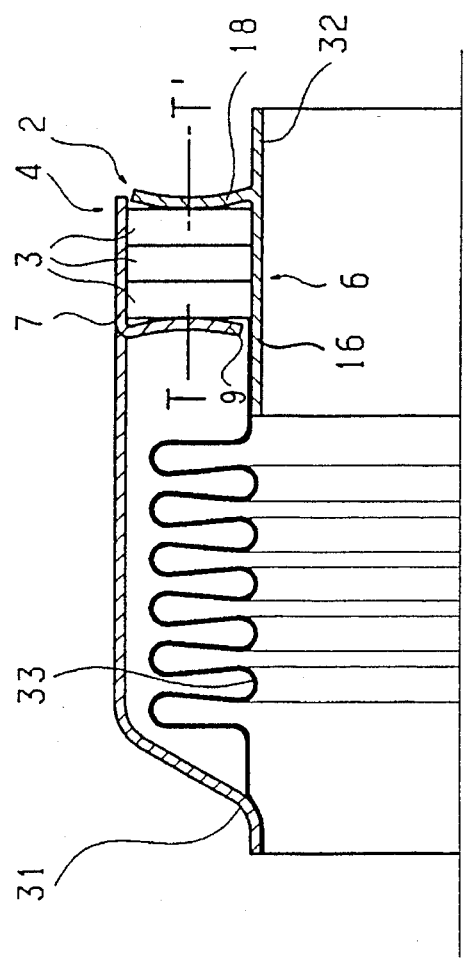
FIG. 9a is a longitudinal cross-sectional view of a portion of a still further embodiment of an apparatus according to the present invention.
Figure 9B:
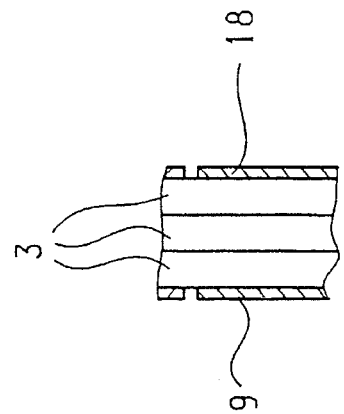

As shown in FIGS. 9a and 9b, several layers of damping cushions 3 may be arranged without any abutment between the clamping cushions 3, with wall portions 9, 18 being curved so as to be convex in relation to the damping cushions 3.

Figure 10A:
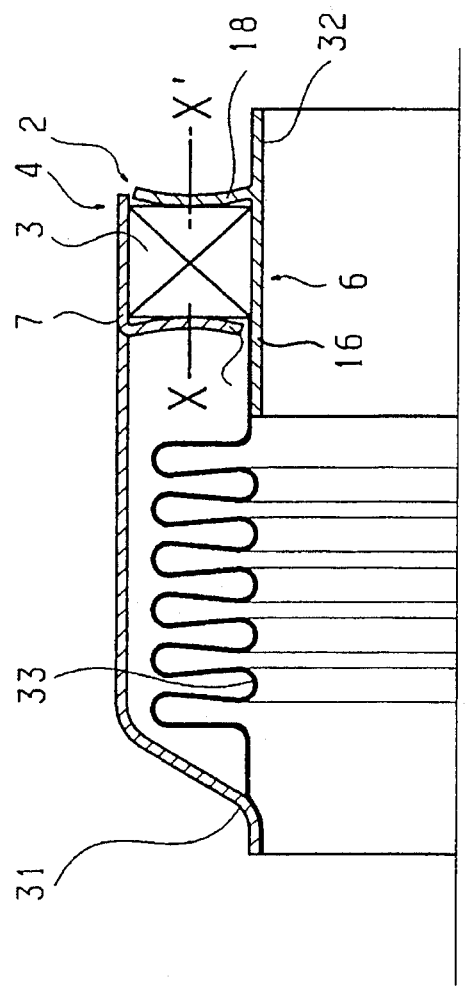
FIG. 10a is a longitudinal cross-sectional view of a portion of another embodiment of an apparatus according to the present invention.
Figure 10B:
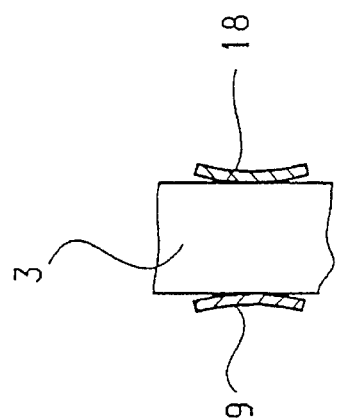

With a single damping cushion 3, as shown in FIGS. 10a, and 10b, the wall portions 9, 18 may also be curved so as to be convex with respect to the damping cushion 3.

I claim:

1. An apparatus for providing a flexible connection of two pipes, comprising:

a first pipe end member adapted for connection to a first pipe;

a second pipe end member adapted for connection to a second pipe;

a flexible line element flexibly connecting said first pipe end member to said second pipe end member;

a casing, including a plurality of first casing wall portions extending radially from said first pipe end member and a plurality of second casing wall portions extending radially from said second pipe end member and axially movable relative to said first casing wall portions, said first casing wall portions and said second casing wall portions being circumferentially juxtaposed in relation to each other, wherein said plurality of first wall portions or said plurality of second wall portions extends radially inwardly from the associated pipe end member; and a damping cushion encircling said first pipe end member and between said first casing wall portion and said second casing wall portion to dampen movement of said second casing wall portion relative to said first casing wall portion.

2. An apparatus according to claim 1 wherein said first casing wall portions form a first end face of said casing and said second casing wall portions form a second end face of said casing, opposite said first end face.

3. An apparatus according to claim 1, wherein said first and second casing wall portions form opposite end faces of said casing and overlap one another in a circumferential direction.

4. An apparatus according to claim 1, wherein said first and second casing wall portions form opposite end faces of said casing.

5. An apparatus according to one of claims 1 and 2, wherein said damping cushion comprises a plurality of damping cushion portions disposed in layers in an axial direction of said casing.

6. An apparatus according to one of claims 1 or 2, wherein said damping cushion comprises a plurality of damping cushion portions juxtaposed circumferentially.

7. An apparatus according to claim 2, wherein said first casing wall portions are of a different size than said second casing wall portions.

8. An apparatus according to claim 2, wherein said first casing wall portions have a different total surface area than said second casing wall portions.

9. An apparatus according to one of claims 1 or 2, wherein said casing wall portions are curved.

10. An apparatus according to claim 9, wherein said casing wall portions are convex with respect to said damping cushion.

11. An apparatus according to one of claims 1 or 2, wherein said damping cushion is pretensioned between said first and second casing wall portions.

12. An apparatus according to one of claims 1 or 2, wherein said casing wall portions form first and second full wall surfaces facing each other and covering said damping cushion, and said first and second casing wall portions extend at an angle to one another with a circumferential spacing between them.

13. An apparatus according to one of claims 1 or 2, wherein said casing includes extension portions extending angularly with respect to said casing wall portions so as to enable fastening of said casing to said first and second pipe members.

14. An apparatus according to one of claims 1 or 2, wherein said casing wall portions have fins directed radially toward the interior of said casing.

15. An apparatus according to one of claims 1 or 2, further comprising a pipe member extending from one of said first pipe end member and said second pipe end member and at least partly covering said flexible line element, with at least a part of said casing wall portions the casing forming one of the first and second abutments for extending radially from said pipe member.

16. An apparatus according to one of claims 1 or 2, further comprising a pipe member extending from one of said first pipe end member and said second pipe end member, Within said flexible line element, and at least partly along said flexible line element.

17. An apparatus according to one of claims 1 or 2, further comprising a protection ring positioned at least in front of an end face of said flexible line element and extending substantially over the radial height of said flexible line element.

18. An apparatus according to one of claims 1 or 2, wherein said flexible line element comprises a metal bellows.

19. An apparatus according to claim 1 wherein the two pipes are provided in exhaust lines of motor vehicles.

20. An apparatus according to claim 1 wherein said damping cushion comprises a pressed metal wire damping cushion.

* * * * *